United States Patent
Mahnkopf et al.

(10) Patent No.: US 11,634,111 B2
(45) Date of Patent: Apr. 25, 2023

(54) BRAKE SYSTEM AND METHOD FOR BRAKING A MOTOR VEHICLE

(71) Applicant: Robert Bosch GmbH, Stuttgart (DE)

(72) Inventors: Dirk Mahnkopf, Eglosheim (DE); Volker Mehl, Bruchsal-Untergrombach (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 16/918,354

(22) Filed: Jul. 1, 2020

(65) Prior Publication Data
US 2021/0009096 A1 Jan. 14, 2021

(30) Foreign Application Priority Data
Jul. 11, 2019 (DE) .......................... 102019210271.9

(51) Int. Cl.
| | |
|---|---|
| *B60T 8/26* | (2006.01) |
| *B60T 8/32* | (2006.01) |
| *B60T 8/36* | (2006.01) |
| *B60T 8/40* | (2006.01) |
| *B60T 8/48* | (2006.01) |
| *B60T 8/94* | (2006.01) |

(Continued)

(52) U.S. Cl.
CPC .............. *B60T 8/266* (2013.01); *B60T 8/322* (2013.01); *B60T 8/364* (2013.01); *B60T 8/367* (2013.01); *B60T 8/3635* (2013.01); *B60T 8/4022* (2013.01); *B60T 8/4081* (2013.01); *B60T 8/4809* (2013.01); *B60T 8/94* (2013.01); *B60T 13/12* (2013.01); *B60T 13/686* (2013.01)

(58) Field of Classification Search
CPC . B60T 8/94; B60T 8/266; B60T 8/322; B60T 8/364; B60T 8/367; B60T 8/3635; B60T 8/4022; B60T 8/4081; B60T 13/12; B60T 13/662
USPC .................................................... 303/113.1
See application file for complete search history.

(56) References Cited

U.S. PATENT DOCUMENTS 5,255,962 A * 10/1993 Neuhaus ................. B60T 8/321
701/76
5,752,748 A * 5/1998 Schramm ................ B60T 8/885
303/20

(Continued)

FOREIGN PATENT DOCUMENTS

EP 0728086 A1 8/1996

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A brake system for a motor vehicle, having a first hydraulic brake device configured to brake wheels on a first axle of the motor vehicle, a first control unit configured to control the braking operation of the wheels on the first axle; and a second hydraulic brake device configured to brake the wheels on a second axle of the motor vehicle, and a second control unit configured to control the braking operation of the wheels on the second axle. The first control unit is coupled with the second control unit via a communication channel. The first control unit and the second control unit are each configured to receive data that are relevant for the control of the braking operation, the first control unit furthermore being configured to transmit a data signal on the basis of the received data via the communication channel to the second control unit.

10 Claims, 3 Drawing Sheets

(51) Int. Cl.
*B60T 13/68* (2006.01)
*B60T 13/12* (2006.01)

(56) References Cited

U.S. PATENT DOCUMENTS

| | | | | |
|---|---|---|---|---|
| 2005/0278107 | A1* | 12/2005 | Disser | B60T 17/043 |
| | | | | 701/76 |
| 2011/0320099 | A1* | 12/2011 | Kim | B60T 8/885 |
| | | | | 701/70 |
| 2016/0339888 | A1* | 11/2016 | Yokoyama | F16D 65/18 |
| 2017/0361823 | A1* | 12/2017 | Kim | B60T 13/161 |
| 2018/0118180 | A1* | 5/2018 | Strehle | B60T 8/268 |
| 2018/0141530 | A1* | 5/2018 | Kilmurray | B60T 13/745 |
| 2018/0236876 | A1* | 8/2018 | Isono | B60T 13/746 |
| 2018/0290640 | A1* | 10/2018 | Johnson | B60T 13/662 |
| 2019/0054909 | A1* | 2/2019 | Shah | B60T 8/885 |

* cited by examiner

BRAKE SYSTEM AND METHOD FOR BRAKING A MOTOR VEHICLE

CROSS REFERENCE

The present application claims the benefit under 35 U.S.C. § 119 of German Patent Application No. DE 102019210271.9 filed on Jul. 11, 2019, which is expressly incorporated herein by reference in its entirety.

FIELD

The present invention relates to a brake system for braking a motor vehicle and to a method for braking a motor vehicle.

BACKGROUND INFORMATION

Motor vehicles having dual circuit-type braking systems have two mutually independent line circuits for actuating the brakes of the individual wheels. Even if one of the line circuits fails, this allows for a controlled deceleration of the motor vehicle using the remaining line circuit. The two line circuits share a common master brake cylinder. There are basically five different systems with regard to the actuation of the wheels of the different axles, i.e. a II-split, an X-split, an LL-split, an HT-split, and an HH split. The line circuits in different systems differ in the number and placement of the wheels that are braked by the respective line circuits.

For a better emergency running strategy in a failure of components, an electronic brake system is described in EP Patent No. EP 0728086 B1. This electronic brake system has a central module and brake modules allocated to the brake circuits or wheel groups, which are able to communicate with one another.

SUMMARY

The present invention provides a brake system for a motor vehicle and a method for braking a motor vehicle.

According to a first aspect, the present invention thus pertains to a brake system for a motor vehicle having a first hydraulic brake device and a second hydraulic brake device. The first hydraulic brake device brakes the wheels on a first axle of the motor vehicle, but not on a second axle of the motor vehicle, and has a first control unit which controls the braking operation of the wheels on the first axle of the motor vehicle. The second hydraulic brake device brakes the wheels on the second axle of the motor vehicle, but not on the first axle of the motor vehicle, and has a second control unit, which controls the braking operation of the wheels on the second axle of the motor vehicle. The first control unit is coupled with the second control unit via a communication channel. The first control unit and the second control unit are configured to receive data that are relevant for the control of the braking operation. Based on the received data, the first control unit transmits a data signal via the communication channel to the second control unit.

According to a second aspect, the present invention relates to a method for braking a motor vehicle in which a braking operation of wheels on a first axle of the motor vehicle is controlled by a first control unit, and a braking operation of wheels on a second axle of the motor vehicle is controlled by a second control unit. The first control unit is coupled with the second control unit via a communication channel. The first control unit receives first data that are relevant for the control of the braking operation. The second control unit receives second data that are relevant for the control of the braking operation. On the basis of the first data received by the first control unit, the first control unit generates a data signal and transmits it via the communication channel to the second control unit. Given an intact communication channel, the second control unit controls the braking operation of the wheels of the second axle using the received data signal. In an interruption of the communication channel, the second control unit controls the braking operation of the wheels of the second axle of the motor vehicle based on the second data received by the second control unit.

Preferred embodiments of the present invention are described herein.

In accordance with an example embodiment of the present invention, a brake system is described which is designed in an axle-wise fashion, which means that the first hydraulic brake device and the second hydraulic brake device are designed to carry out braking operations of the wheels of the corresponding axles independently of one another. In particular, the brake system preferably has no common master brake cylinder. The first hydraulic brake device and the second hydraulic brake device are preferably capable of building up pressure on their own in order to brake the wheels of the corresponding axle. In addition, the first control unit and the second control unit may be configured to model the pressure, in particular in order to implement ABS and/or ESP functionalities. Preferably, the first hydraulic brake device and the second hydraulic brake device are coupled only electronically via the communication channel between the first control unit and the second control unit but have no hydraulic connection. This makes it possible to dispense with long hydraulic lines between the front axle and the rear axle, which is advantageous in terms of the space requirement.

The axle-wise brake system builds on conventional components used in brake systems that are not based on axles and thus in essence does not require new technology. In particular, the first hydraulic brake device and the second hydraulic brake device may have an essentially identical development, which simplifies a series production. With regard to the output power, the drives of the first hydraulic brake device and the second hydraulic brake device are able to be selected in accordance with the axle volume. On the front axle, for example, approximately twice the power may be required than on the rear axle.

The first control unit forms a master unit, which provides the received data via the communication channel to the second control unit acting as a slave unit. However, in order to enable the second control unit to continue the control of the braking operation even if the communications link between the first control unit and the second control unit has failed, the present invention provides that the second control unit also receive data that are relevant for the control of the braking operation. However, most of the data typically required for the control of the braking operation are preferably acquired with the aid of sensors which are linked only with the first control unit, so that additional direct data lines between the individual sensors and the second control unit are not required. Preferably, the second control unit is coupled only with sensors that are situated in the region of the second axle, in particular closer to the second axle than to the first axle, such as acceleration sensors or wheel-speed sensors for measuring a wheel speed of the wheels of the second axle. As a result, an ABS functionality and/or an electronic brake force distribution (EBD) is still able to be made available even in a failure of the communications link between the first control unit and the second control unit.

The first axle is preferably a front axle of the motor vehicle, and the second axle is a rear axle of the motor vehicle.

The data relevant for the control of the braking operation in particular include the acquired sensor data from different sensors of the motor vehicle, some of which in particular could be wheel-speed sensors measuring the wheel speeds of the wheels of the first axle, wheel-speed sensors measuring the wheel speeds of the wheels of the second axle, a yaw rate sensor, a transverse acceleration sensor, a steering angle sensor, and a sensor for determining the inlet pressure of a hydraulic brake unit. The data relevant for the control of the braking operation may particularly include a driver brake input, which, for example, is able to be ascertained on the basis of sensor data of a travel sensor and/or a pressure sensor on the brake pedal of the motor vehicle, for instance.

According to one preferred embodiment of the brake system according to the present invention, the first hydraulic brake device includes a sensor device for detecting a driver brake input. In particular, the first hydraulic brake device may include a travel sensor and/or a pressure sensor on the brake pedal of the motor vehicle, which output(s) sensor signals for outputting the driver brake input.

According to one preferred embodiment of the brake system according to the present invention, the first hydraulic brake device includes an hydraulic fallback level, which makes it possible for a driver of the motor vehicle to build up brake pressure even without support.

According to one preferred further development of the brake system according to the present invention, the first and the second control unit are coupled with different devices in order to receive the data that are relevant for the control of the braking operation. For example, the second control unit is able to be coupled with a wheel-speed sensor on the second axle and to receive the measured wheel speed of the wheels of the second axle. The first control unit is able to be coupled with further sensors and to receive further data relevant for the control of the braking operation. The first control unit is able to convey these received further data relevant for the control of the braking operation to the second control unit or transmit a control signal based on these data to the second control unit, while the second control unit transmits the measured wheel speed of the wheels of the second axle to the first control unit.

According to one preferred further development of the brake system in accordance with the present invention, given an intact communication channel, the second control unit is configured to carry out the braking operation of the wheels of the second axle of the motor vehicle using the received data signal. The data received by the second control unit itself may be utilized as supplementation.

According to one preferred further development of the brake system in accordance with the present invention, in the event of an interruption of the communication channel, the second control unit is configured to control the braking operation of the wheels of the second axle of the motor vehicle on the basis of the data received by the second control unit. While the second control unit may no longer be able to access the data acquired by the first control unit because the communications link has been severed, it is still able to carry out the braking operation on the basis of the data it received itself.

According to one preferred further development of the brake system in accordance with the present invention, the second control unit is configured to transmit a further data signal on the basis of the received data via the communication channel to the first control unit. Given an intact communication channel, the first control unit is configured to carry out the braking operation of the wheels of the first axle using the further data signal. The communication channel thus allows for a bidirectional communication between the first control unit and the second control unit. In a normal operation, both control units are able to access all data, whereas in an interruption in the communication channel, the control units utilize only the data they received themselves for the control of the braking operation.

According to one preferred further development of the present invention, the brake system has at least one sensor device, which is configured to generate the data that are relevant for the control of the braking operation and to transmit the data to the first control unit and/or the second control unit. In this case, the devices that generate the data relevant for the braking are therefore themselves part of the brake system.

According to one preferred further development of the brake system in accordance with the present invention, the at least one sensor device includes a wheel-speed sensor which ascertains the rotational speed of a wheel of the second axle of the motor vehicle and transmits a sensor signal to the second control unit on the basis of the ascertained rotational speed.

According to one preferred further development of the brake system in accordance with the present invention, the at least one sensor device includes an acceleration sensor, which ascertains an acceleration of the motor vehicle and transmits a sensor signal to the second control unit on the basis of the ascertained acceleration.

According to one preferred further development of the brake system in accordance with the present invention, the acceleration sensor and/or the second control unit is/are configured to ascertain a deceleration of the motor vehicle in the longitudinal direction on the basis of the ascertained acceleration of the motor vehicle. When calculating the deceleration of the motor vehicle in the longitudinal direction, in particular the gradient of the surface on which the vehicle is traveling is able to be taken into account.

According to one preferred further development of the brake system in accordance with the present invention, the wheel-speed sensor and/or the second control unit is/are configured to calculate a deceleration of the motor vehicle in the longitudinal direction on the basis of the ascertained rotational speed of a wheel of the second axle of the motor vehicle.

Figure 1:
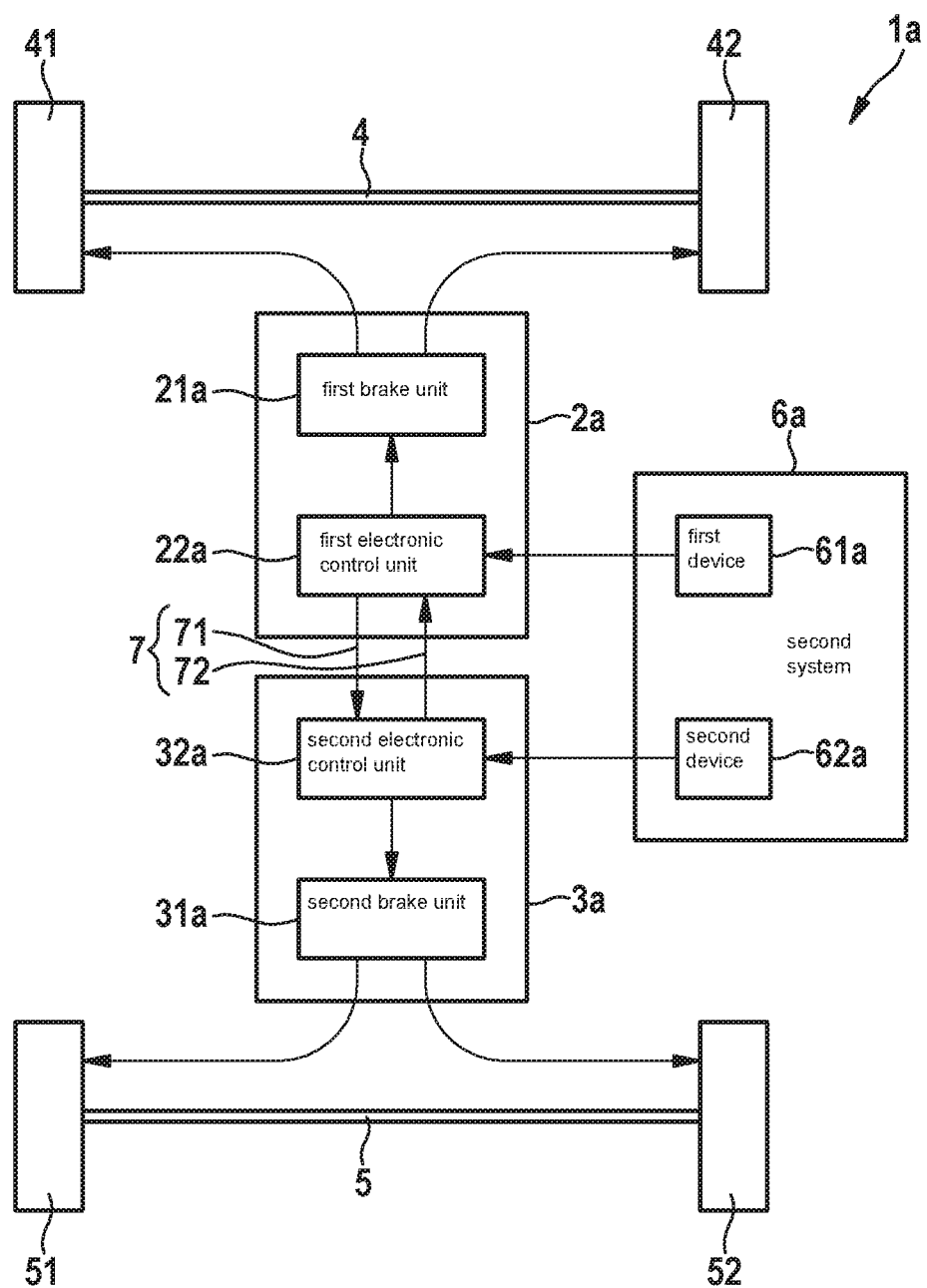
FIG. 1 shows a schematic block diagram of a brake system according to a first embodiment of the present invention.

Identical or functionally equivalent elements and devices in all of the figures have been provided with the same reference numerals. The numbering of method steps is used for the sake of clarity and in general is not meant to imply a certain time sequence. It is particularly also possible to carry out a plurality of method steps simultaneously.

DETAILED DESCRIPTION OF EXAMPLE EMBODIMENTS

FIG. 1 shows a schematic block diagram of a brake system 1a having a first hydraulic brake device 2a, which brakes wheels 41, 42 on a first axle 4, in particular a front axle of the motor vehicle. In addition, brake system 1a includes a second hydraulic brake device 3a, which brakes wheels 51, 52 on a second axle 5, in particular on a rear axle of the motor vehicle. For this purpose, first hydraulic brake device 2a includes a first brake unit 21a, which is controlled by a first electronic control unit 22a (ECU) and has hydraulic components in order to decelerate wheels 41, 42 on first axle 4. Accordingly, second hydraulic brake device 3a includes a second brake unit 31a, which is controlled by a second control unit 32a (ECU; electronic control unit) and has hydraulic components in order to decelerate wheels 51, 52 on second axle 5.

First control unit 22a is electronically coupled with a first device 61a of a sensor system 6a of the motor vehicle, and second control unit 32a is electronically coupled with a second device 62a of sensor system 6a. Sensor system 6a may be part of brake system 1a or also be an external element. For example, first device 61a may ascertain a driver braking input, for instance on the basis of sensor data of a travel sensor and/or a pressure sensor on the brake pedal of the motor vehicle, and transmit the driver braking input to first control unit 22a. In addition, first device 61a may include at least one wheel-speed sensor, which measures the wheel speed of wheels 41, 42 of first axle 4, a yaw rate sensor, a transverse acceleration sensor, a steering angle sensor, and a sensor for determining the inlet pressure of first brake unit 21a. Second device 62a, for example, may include a wheel-speed sensor which measures the wheel speed of wheels 51, 52 of second axle 5.

First control unit 22a is electronically coupled with second control device 32a via a communication channel 7, and first control unit 22a generates a data signal 71 on the basis of the received data and transmits the data to second control unit 32a. Optionally, second control unit 32a is also able to generate a further data signal 72 on the basis of the data received by second control unit 32a, which is transmitted to first control unit 22a.

During a normal operation, that is to say, with an operative data link via communication channel 7, first control unit 22a and second control unit 32a control the braking operation on the basis of the data received from first device 61a and second device 62a in each case, and also on the basis of data signals 71, 72 received from the respective other control unit 22a, 32a.

If the data connection via communication channel 7 is interrupted due to a fault, then first control unit 22a and second control unit 32a control the braking operation exclusively based on the data received from first device 61a and second device 62a in each case.

Figure 2:
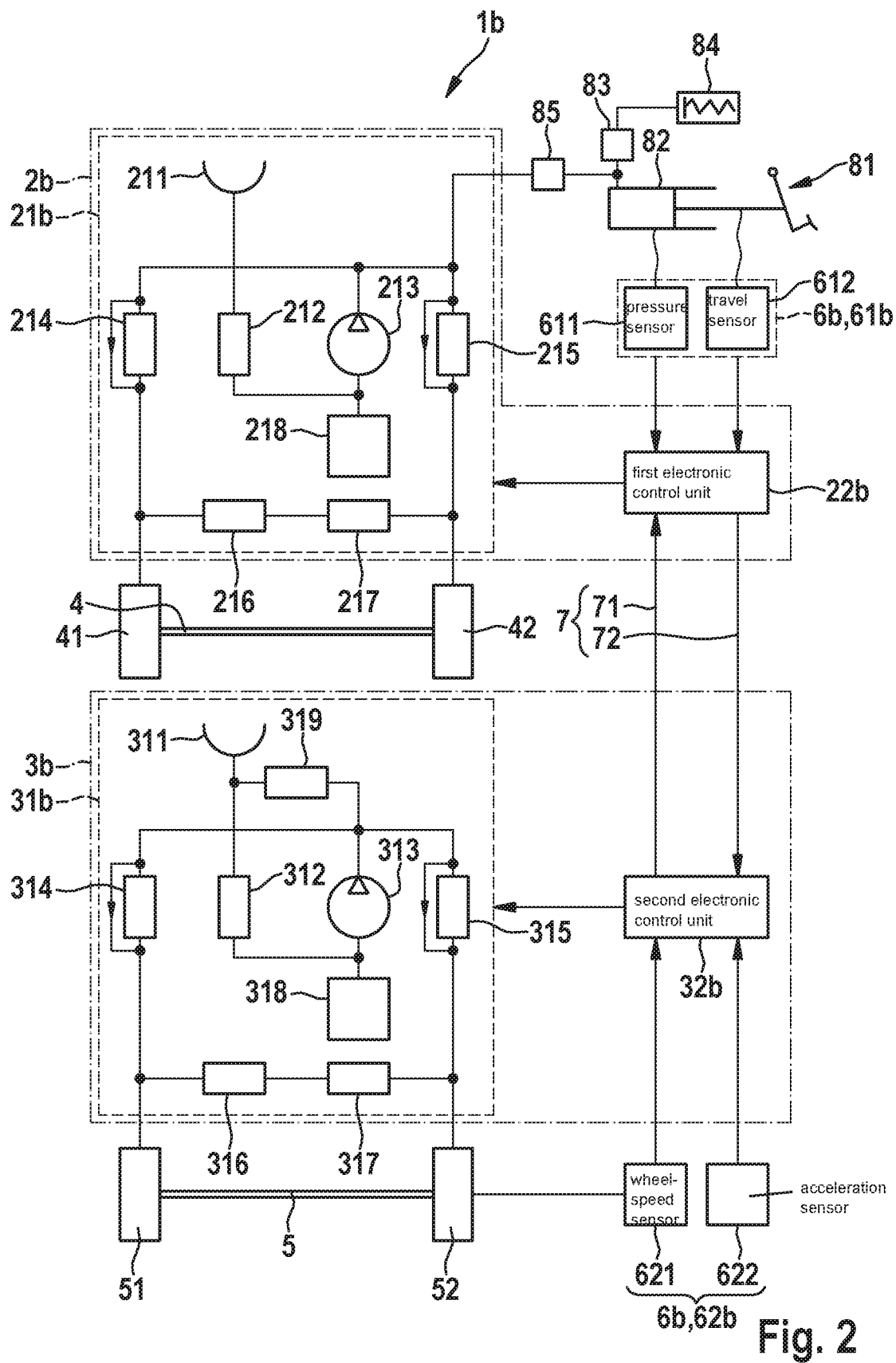
FIG. 2 shows a schematic block diagram of a brake system according to a second embodiment of the present invention.

FIG. 2 shows a schematic block diagram of a brake system 1b. A driver of a motor vehicle builds up pressure in a cylinder 82 via a brake pedal 81. A travel sensor 612 outputs an electrical signal corresponding to the displacement of the piston in cylinder 82, and thus converts travel S into voltage U. A pressure sensor 611 outputs an electrical signal corresponding to the pressure in cylinder 82, and thus converts pressure P into voltage U. Travel sensor 612 and pressure sensor 611 are denoted as first device 61b.

Via a simulator valve 83, cylinder 82 is hydraulically connected to a simulator unit 84 for the generation of a brake pressure. According to further embodiments, however, instead of simulator unit 84, it is also possible to provide an electromechanical brake booster, in particular an iBooster developed by the Bosch company. As a result, the brake pressure is able to be completely generated by simulator unit 84, but the driver is also able to contribute to the buildup of the brake pressure.

Via an isolation valve 85, cylinder 82 is furthermore hydraulically connected to a first brake unit 21b of a first hydraulic brake device 2b. The hydraulic connection branches to a first motor-driven pump 213 for the pressure buildup, via a first inlet valve 214 to a first wheel cylinder of a first wheel 41 of a first axle 4, as well as via a second inlet valve 215 to a second wheel cylinder of a second wheel 42 of first axle 4. Corresponding first and second discharge valves 216, 217 are provided for discharging the brake fluid from the respective wheel cylinder. First pump 213 is furthermore connected via a first high-pressure switching valve 212 to a first reservoir 211, as well as to a first storage element 218 for storing the hydraulic fluid. First brake unit 21b essentially corresponds to one half of an ESP system in terms of its design, but a suction path of first pump 213 is directly connected to first reservoir 211 in order to prevent the fluid from being aspirated during an autonomous pressure buildup in a manner that the driver can perceive.

A second hydraulic brake device 3b includes a second brake unit 31b, which has a second reservoir 311, which is connected via a valve 319 to an input of a second pump 313 and via a second high-pressure switching valve 312 to an output of second pump 313. The output of second pump 313 is furthermore connected to a second storage element 318 for storing the hydraulic fluid. Second reservoir 311 is also connected via valve 319 by way of branches on the one side via a third inlet valve 314 to a third wheel cylinder of a third wheel 51 on a second axle 5, as well as on the other side via a fourth inlet valve 315 to a fourth wheel cylinder of a fourth wheel 52 on second axle 5. Corresponding third and fourth discharge valves 316, 317 are provided for the discharge of the brake fluid from the respective wheel cylinder.

First hydraulic brake device 2b includes a first control unit 22b, and second hydraulic brake device 3b includes a second control unit 32b. First control unit 22b is configured to receive the sensor data of first device 61b. In addition, first control unit 22b may be coupled with additional sensors, in particular with a steering sensor, a yaw-rate sensor or a rate-of-rotation sensor in order to receive corresponding sensor signals. First control unit 22b transmits all or a portion of the received sensor data to second control unit 32b or transmits a data signal 71 generated on the basis of these sensor data to second control unit 32b.

Second control unit 32b is configured to receive sensor data from a wheel-speed sensor 621, which acquires a wheel speed of at least one of wheels 51, 52 on second axle 5. Second control unit 32b is furthermore coupled with an acceleration sensor 622, which ascertains an acceleration of the motor vehicle. Wheel-speed sensor 621 and acceleration sensor 622 are denoted as second device 62b. First device 61b and second device 62b are part of a sensor system 6b of the motor vehicle. Sensor system 6b may also be considered to be part of brake system 1b. Second control unit 32b transmits the received sensor data to first control unit 22b or transmits a data signal 72 generated on the basis of these sensor data to first control unit 22b. Data signals 71, 72 are exchanged via a communication channel 7.

Based on the sensor data received from first device 61b as well as the data received from second control unit 32b, first control unit 22b carries out a braking operation of wheels 41, 42 on first axle 4. For this purpose, first control unit 22b is able to control valves 83, 85, 212, 214, 215, 216, 217 as well as first pump 213. For example, based on the sensor signals of travel sensor 612 or based on pressure sensor 611, a driver braking input is able to be identified by first control unit 22b. First control unit 22b builds up corresponding pressure in the wheel brakes and sets it. Toward this end, cylinder 82 is connected to simulator unit 84 and isolation valve 85 is closed. First high-pressure switching valve 212 is opened, first pump 213 is started, and fluid is displaced via inlet valves 214, 215 into the wheel cylinders of wheels 41, 42 of first axle 4.

Based on the sensor data received from second device 62b as well based on the data received from first control unit 22b, second control unit 32b carries out a braking operation of wheels 51, 52 on second axle 5. Toward this end, second control unit 32b controls valves 312, 314, 315, 316, 317, 319 as well as second pump 313.

First control unit 22b and second control unit 32b are each configured to build up the brake pressure and may furthermore jointly provide an ABS as well as an ESP functionality. For this purpose, the wheel pressures are able to be adjusted on an individual basis. The aspiration of fluid, the filling of the wheel cylinders as well as the discharging of the fluid takes place via the direct connection to respective reservoir 211, 311.

According to one variant, it may be provided that brake system 1b is decoupled from the driver, or in other words, a correlation between input force F in and input travel S_in in cylinder 82 is independent of the wheel pressure. Even a pressure buildup individually for each wheel is possible without the driver becoming aware of it and without having to cancel the decoupling. In addition, brake system 1b may be configured to smoothly blend the brake torques at axles 4, 5.

Furthermore, shorten the braking distance, first control unit 22b and second control unit 32b may be configured to automatically adjust the time requirement from the brake activation until the wheels reach the blocking limit and the ABS comes to act (time-to-lock, TTL) at a corresponding engine output. This time requirement corresponds to the time until the maximum deceleration is achieved. The shorter this time requirement, the shorter the braking distance.

If one of the hydraulic circuits of first hydraulic brake device 2b or second hydraulic brake device 3b fails due to leakage, the corresponding wheel is hydraulically separated via associated inlet valve 214, 215, 314, 315 and/or discharge valve 216, 217, 316, 317.

In the event of a failure of a pump 213, 313, the driver displaces the volume of the fluid via isolation valve 85 into first brake unit 21b.

In the event of a power failure, simulator valve 83 remains closed and isolation valve 85 is open. In this case, the driver is able to build up pressure directly in the wheel cylinders.

In an interruption in communication channel 7, second hydraulic brake device 2b is still able to continue with a braking operation. For this purpose, second control unit 22b is able to determine the vehicle deceleration, for instance from the sensor data received from wheel-speed sensor 621 on the basis of the change in the wheel speed. Second control unit 22b is then able to infer the brake pressure of wheels 41, 42 of first axle 4, and thus the driver brake input, from the vehicle deceleration. This enables second control unit 22b to determine the setpoint value for the brake pressure for wheels 51, 52 of second axle 5.

In addition, it may be provided that second control unit 32b calculates the vehicle deceleration based on the sensor data received from acceleration sensor 622 and thereby determines the setpoint value for the brake pressure for wheels 51, 52 of second axle 5.

Second control unit 32b may also take into account both the sensor data from acceleration sensor 622 and from wheel-speed sensor 621.

In addition, second control unit 22b may be configured to determine the vertical acceleration in order to correct the vehicle longitudinal deceleration by a possible position component.

Figure 3:
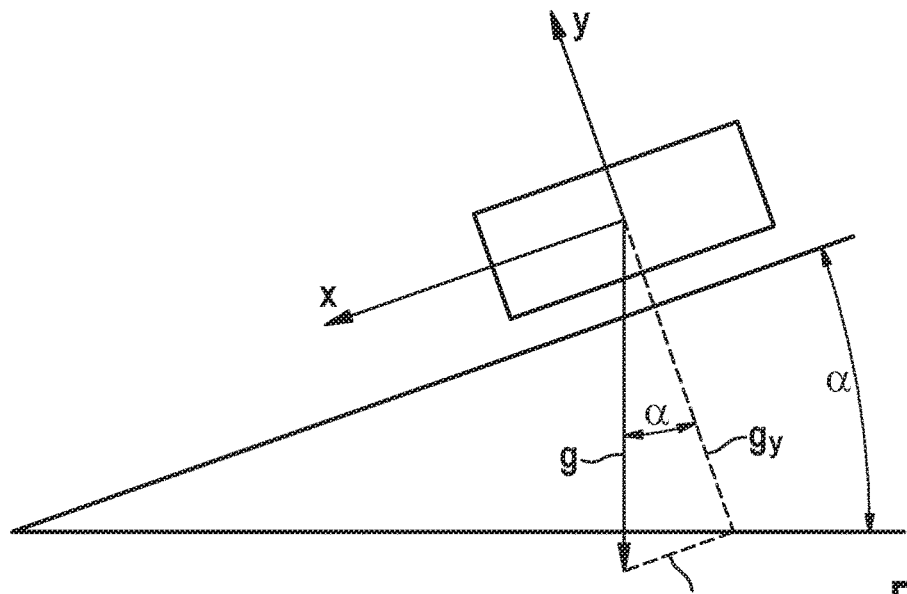
FIG. 3 shows a schematic illustration of the velocity components of the motor vehicle when traveling on a downhill grade.

In this context, FIG. 3 shows a schematic illustration of the velocity components of the motor vehicle when driving a downhill grade having gradient α. If the vehicle brakes using a deceleration a, then acceleration sensor 622 ascertains the value $a\_x = a + g \cdot \sin(a)$ for the acceleration in the x-direction parallel to the road, and the value $a\_y = g \cdot \cos(a)$ for the acceleration in the y-direction perpendicular to the road. Second control unit 32b, is able to determine the required value a through resolving using $a = a\_x - g \cdot \sin(\arccos(a\_y/g))$.

As an alternative, it may be provided to determine the position of the motor vehicle by measuring the direction of the magnetic field lines of a magnetic field of the earth, for which a periodic calibration may be provided due to the local deviations.

It may additionally be provided to determine the position information of the motor vehicle from the comparison of the deceleration which is ascertained from the wheel speeds, and the deceleration which is ascertained from the acceleration a_x of the motor vehicle in the longitudinal direction. In the equation $a\_x = a + g \cdot \sin(a)$, the acceleration a_x in the x-direction is able to be obtained directly from the sensor data of acceleration sensor 622, while deceleration a is calculated from the change in the wheel speed. The position information, i.e. gradient α, follows therefrom.

In addition, it may be provided that second control unit 32b estimates the axle loading on second axle 5, which also depends on gradient α of the road and total deceleration a, on the basis of the position information. By setting the wheel pressures on the basis of the ascertained axle loading, overbraking is able to be avoided and/or the electronic brake force distribution supported.

Figure 4:
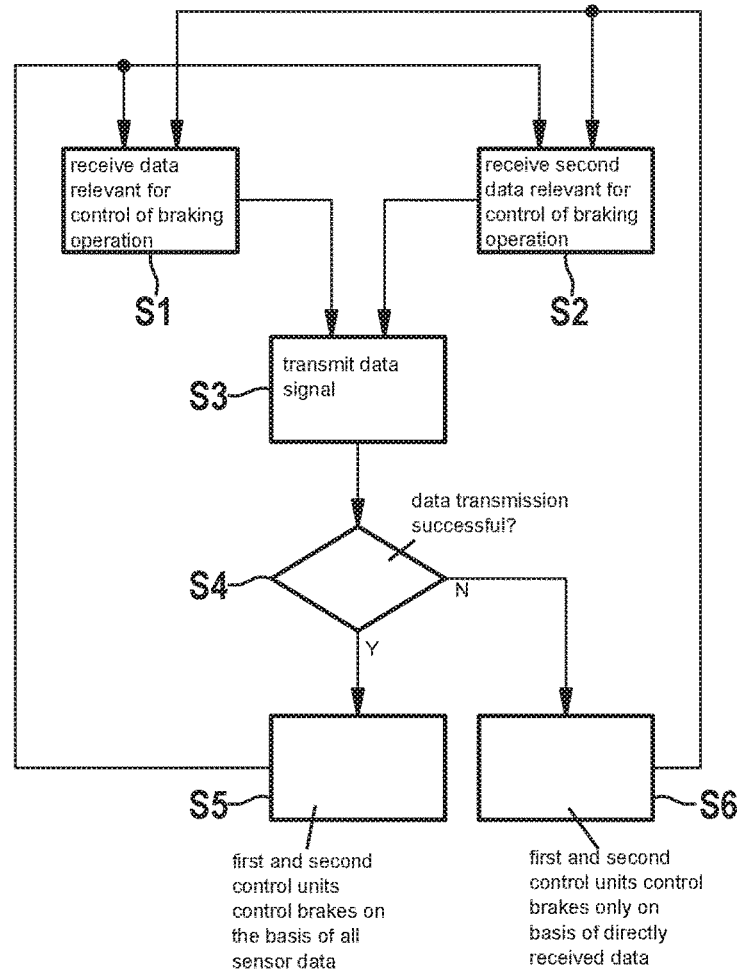
FIG. 4 shows a flow diagram of a method for braking a motor vehicle according to one embodiment of the present invention.

FIG. 4 shows a flow diagram of an example method for braking a motor vehicle in accordance with the present invention. The method is able to be carried out using one of the afore-described brake systems 1a, 1b. The braking operation is controlled for each axis, i.e., the braking operation of wheels 41, 42 of a first axle 4 of the motor vehicle is carried out by a first control unit 22a, 22b, and the braking operation of wheels 51, 52 on a second axle 5 of the motor vehicle is carried out by a second control unit 32a, 32b. Brake units 21a, 21b and 31a, 31b of hydraulic brake devices 2a, 2b and 3a, 3b, respectively, which are in charge of the braking of respective axles 4, 5, are not hydraulically connected to one another. However, first control unit 22a, 22b is coupled with second control unit 32a, 32b via a communication channel 7.

In a first step S1, data that are relevant for the control of the braking operation are received by first control unit 22a. For instance, first control unit 22a may receive sensor data from a wheel-speed sensor measuring the wheel speeds of wheels 41, 42 of first axle 4, a yaw-rate sensor, a transverse acceleration sensor, a steering angle sensor, and/or a sensor for determining the inlet pressure of a hydraulic brake unit.

In a second step S2, second control unit 32a, 32b receives second data that are relevant for the control of the braking operation, in particular sensor data from a wheel-speed sensor 621 measuring the wheel speeds of wheels 51, 52 of second axle 5, or sensor data from an acceleration sensor 622.

The first two method steps S1, S2 are able to be carried out simultaneously or in any desired sequence.

In a further method step S3, first control unit 22a, 22b transmits a data signal generated on the basis of the received data to second control unit 32a, 32b via communication channel 7. Optionally, second control unit 32a, 32b is also able to transmit the received data via communication channel 7 to first control unit 22a, 22b.

If it is determined in a further method step S4 that the data transmission was successful, then first control unit 22a, 22b and second control unit 32a, 32b control the brakes of the respective axles 4, 5 on the basis of all sensor data, step S5.

However, if it is determined, S4, that the data transmission was faulty or the transmission via communication channel 7 is impossible, then first control unit 22a, 22b and second control unit 32a, 32b control the brakes of respective axles 4, 5 only on the basis of the data directly received in steps S1, S2 in each case.

What is claimed is:

1. A brake system for a motor vehicle, comprising:
a first hydraulic brake device which is configured to brake wheels on a first axle of the motor vehicle, the first hydraulic brake device including a first control unit which is configured to control a braking operation of the wheels on the first axle of the motor vehicle; and
a second hydraulic brake device which is configured to brake wheels on a second axle of the motor vehicle, the second hydraulic brake device including a second control unit configured to control a braking operation of the wheels on the second axle of the motor vehicle, the first control unit being coupled with the second control unit via a communication channel;
wherein the first control unit and the second control unit are each configured to receive data that are relevant for the control of the braking operation, and the first control unit is further configured to transmit a data signal, based on the received data, via the communication channel to the second control unit, and
wherein the second control unit is configured to transmit a further data signal, based on the received data, via the communication channel to the first control unit, and when the communication channel is intact, the first control unit is configured to carry out the braking operation of the wheels of the first axle using the further data signal.

2. The brake system as recited in claim 1, wherein the first control unit and the second control unit are, relative to each other, able to be coupled with at least partly different devices, to receive the data that are relevant for the control of the braking operation.

3. The brake system as recited in claim 1, wherein when the communication channel is an intact, the second control unit is configured to carry out the braking operation of the wheels of the second axle of the motor vehicle using the data signal received from the first control unit.

4. The brake system as recited in claim 1, wherein in the event of an interruption in the communication channel, the second control unit is configured to control the braking operation of the wheels of the second axle of the motor vehicle on the basis of the data received by the second control unit.

5. The brake system as recited in claim 1, further comprising:
at least one sensor device configured to generate the data that are relevant for the control of the braking operation and to transmit the data to the first control unit and/or to the second control unit.

6. The brake system as recited in claim 5, wherein the at least one sensor device includes a wheel-speed sensor, which is configured to ascertain a rotational speed of a wheel of the second axle of the motor vehicle and to transmit a sensor signal based on the ascertained rotational speed to the second control unit.

7. The brake system as recited in claim 5, wherein the at least one sensor device includes an acceleration sensor, which is configured to ascertain an acceleration of the motor vehicle and to transmit a sensor signal, based on the ascertained acceleration, to the second control unit.

8. The brake system as recited in claim 7, wherein the acceleration sensor and/or the second control unit is configured to ascertain a deceleration of the motor vehicle in a longitudinal direction based on the ascertained acceleration of the motor vehicle.

9. The brake system as recited in claim 6, wherein the wheel-speed sensor and/or the second control unit is configured to calculate a deceleration of the motor vehicle in a longitudinal direction based on the ascertained rotational speed of a wheel of the second axle of the motor vehicle.

10. A method for braking a motor vehicle, a braking operation of wheels on a first axle of the motor vehicle being controlled by a first control unit, and a braking operation of wheels on a second axle of the motor vehicle being controlled by a second control unit, the first control unit being coupled with the second control unit via a communication channel, the method comprising the following steps:
receiving first data that are relevant for the control of the braking operation by the first control unit;
receiving second data that are relevant for the control of the braking operation by the second control unit; and
transmitting a data signal generated based on the received first data from the first control unit via the communication channel to the second control unit;
wherein when communication channel is intact, the second control unit controlling the braking operation of the wheels of the second axle using the received data signal; and
wherein in the event of an interruption in the communication channel, the second control unit controlling the braking operation of the wheels of the second axle of the motor vehicle based on the second data received by the second control unit, and
wherein the second control unit is configured to transmit a further data signal, based on the received data, via the communication channel to the first control unit, and when the communication channel is intact, the first control unit is configured to carry out the braking operation of the wheels of the first axle using the further data signal.

* * * * *